Patented Feb. 7, 1950

2,496,270

UNITED STATES PATENT OFFICE 2,496,270

SKIN DRESSINGS WITH FUGITIVE COLORS

Myron A. Coler, New York, N. Y., assignor to Synergistics, Inc., New York, N. Y., a corporation of New York No Drawing. Application February 9, 1946, Serial No. 646,707

3 Claims. (Cl. 167—22)

This invention relates to skin dressings having fugitive colors. More particularly, the invention relates to insect repellents, sun-tan oils, antiseptics, liniments, lotions and similar skin dressings which have contrasting colors while they are being applied to human skin but which shortly thereafter become colorless or imperceptible.

It is a common desideratum of skin dressings that they be colorless or of light flesh-like colors so that they will not impart an unnatural or conspicuous color to the parts of the skin to which they may be applied. Another reason for desiring colorless skin dressings is to prevent staining or discoloration of collars and cuffs rubbing on skin on which a dressing has been spread. From a different point of view, however, it is objectionable that skin dressings be colorless since it frequently develops that "skips" are left in the area of the skin which it is desired to cover. If, on the other hand, the dressing would have a color contrasting with that of the skin, "skips" would be readily noticed and therefore could be promptly corrected. It is obvious that "skips" represent portions of the skin which receive no benefit from the application of the dressing. For example, any skipped area of skin on which a sun-tan liquid has been spread is likely to burn and blister when exposed to the sun. Any portion of a wound or bruise which is skipped in the application of an antiseptic is open to infection. In the case of insect repellents, it has been found that the most effective materials will prove unsatisfactory if coverage of exposed skin is incomplete. It has been observed that repellents applied to the skin in a spotty fashion are no deterrents to insects but merely lead the insects to concentrate their attacks on portions of the skin not coated with a repellent film. Accordingly, "skips" in the application of insectifuges lead to discomfort and even disease because of insect bites.

An important object of this invention is to provide skin dressings with coloration which facilitates their proper application and thereafter vanishes or becomes inconspicuous.

Another object is to add fugitive colors to skin dressings without making them injurious to skin or clothing.

Other objects of the invention will become apparent from the description which follows.

In accordance with this invention, there is added to skin dressings such as sun-tan oils, insect repellents, germicides, and other similar medicaments, coloring matter which becomes colorless or imperceptible under the conditions which prevail after application to the skin. Color fugitiveness may arise from one or more chemical and/or physical effects occurring in the selected coloring matter under the conditions of exposure following the application of the colored dressing to the skin. Thus, color changes may result when water, alcohol or other fluid in the dressing is evaporated, or when the coloring matter is readily oxidized in air or quickly destroyed by exposure to sunlight. It has been found advantageous to employ for the purposes of this invention colors which disappear or become imperceptible because of changes in pH when dressings having such colors are applied to the skin.

The following examples of skin dressings will serve to illustrate the invention.

*Example 1.*—An insect repellent for application to human skin was prepared by thoroughly agitating together 10 volumes of 2-ethylhexanediol-1 3 and 9 volumes of concentrated ammonium hydroxide. The mixture was then allowed to settle and the two liquid phases were separated. To the ammoniated ethylhexanediol-rich portion was added 2% by volume of a 10% by weight solution of phenolphthalein in ethanol. The resultant red repellent solution lost its color within a minute upon rubbing out on the skin of the hands and face.

*Example 2.*—A multipurpose skin dressing was made by blending 10 volumes of 2-ethylhexanediol-1,3, 1 volume of a 10% by weight solution of phenolphthalein in ethanol, 2 volumes of glycerol and 2 volume of ethanol and agitating with an excess of powdered anhydrous sodium carbonate. The undissolved solids were removed by centrifuging. The skin dressing was a somewhat viscous liquid with a vivid red color. Within a few minutes after the dressing was spread on the skin, all of the color disappeared. Because of the ethylhexanediol, the dressing was an effective insectifuge; at the same time, the polyhydroxy alcohols were beneficial as skin conditioners. It was noted that the glycerol intensified the color of the dressing. It is indeed surprising that glycerol which is known to be beneficial from a cosmetic viewpoint should prove helpful as a color intensifier.

*Example 3.*—To an antiseptic solution containing about 20% by weight of resorcinol was added a sufficient quantity of an ammoniated solution of phenolphthalein to render the mixture distinctly red. The color facilitated application of this antiseptic, ensuring that no portion of the skin intended for treatment be overlooked. In less than five minutes after the red antiseptic solution had been applied to the skin, the treated area assumed its natural color.

Besides ethylhexanediol, there are several other materials, such as oil of citronella, oil of cloves, dimethyl phthalate, cyclohexyl caprate and Indalone, which are effective as insect repelling agents. It is to be observed that these materials generally are high-boiling, slow-evaporating liquids which have very little or no repelling power at a distance. Thus, it is a common experience, that if only a portion of an arm is coated with a repellent, insects will light on adjacent portions which are uncoated and will proceed to bite without inhibition. Accordingly, the importance of insect repelling dressings embodying the present invention will be obvious.

Where the fugitive coloring of the skin dressing depends on a pH change, suitable compounds other than phenolphthalein include 1,2,3-xylenolphthalein, thymoltetrachlorophthalein, carvacrolsulfonphthalein and other indicators. In place of ammonia and sodium carbonate, there may be used such other alkaline materials as bicarbonates and phosphates of alkali metals, triethanolamine, and morpholine. Naturally, these indicating systems must be matched, i. e., the alkaline material and the indicator must be so selected that the pH range for the color shift of the indicator overlaps, at least in part, the range of pH variation of the alkaline medium under application conditions. Buffering is useful in controlling the time variable of indicating systems.

While there is considerable advantage in incorporating in skin dressings color bodies which exhibit fugitiveness with pH changes, other color bodies may be chosen which are subject to other chemical and/or physical effects. For instance, intense blue solutions of anhydrous cobalt chloride dissolved in anhydrous ethanol yield relatively inconspicuous, faint pink residues upon evaporation of the alcohol and acquisition of moisture. Thus, 1 volume of such a cobalt blue solution may be added to 8 volumes of dimethyl phthalate, the two being miscible, to produce an effective insect repellent with an unusual color change.

It will be clear to those skilled in the art that the present invention of adding colors to skin dressings and other coating compositions, which produce contrasting effects to facilitate and ensure proper application but which vanish or become inconspicuous after application, will find broad utility. The examples presented hereinabove are for illustrative purposes and should not be interpreted in any restrictive sense.

What is claimed is:

1. A normally colorless liquid insect repellent composition adapted for application on human skin comprising an insect repellent in combination with a mixture of phenolphthalein and an alkaline agent, said mixture imparting to said composition a red color contrasting with that of human skin thereby to facilitate application of said composition on human skin and said mixture being adapted to lose rapidly its color-imparting role through exposure to the atmosphere when said composition is applied on human skin.

2. The composition of claim 1 which includes glycerol to intensify said red color.

3. The composition of claim 1 which includes 2-ethylhexanediol-1,3 as insect repelling agent.

MYRON A. COLER.

REFERENCES CITED

The following references are of record in the file of this patent:

UNITED STATES PATENTS

| Number | Name | Date |
|---|---|---|
| 2,084,465 | Stoughton | June 22, 1937 |
| 2,356,801 | Travis et al. | Aug. 29, 1944 |
| 2,366,759 | Thomas et al. | Jan. 9, 1945 |

FOREIGN PATENTS

| Number | Country | Date |
|---|---|---|
| 498,890 | Great Britain | Jan. 16, 1939 |